United States Patent

Snopko et al.

(10) Patent No.: US 9,062,576 B2
(45) Date of Patent: Jun. 23, 2015

(54) EXHAUST PARTICULATE FILTER SYSTEM AND OPERATING METHOD THEREFOR

(75) Inventors: Michael A. Snopko, Washington, IL (US); Rajesh N. Nair, Peoria, IL (US); Frederic Fugere, Chillicothe, IL (US); Andrew A. Knitt, Deer Creek, IL (US); Anthony C. Rodman, Langtoft (GB)

(73) Assignee: Caterpillar Inc., Peoria, IL (US)

( * ) Notice: Subject to any disclaimer, the term of this patent is extended or adjusted under 35 U.S.C. 154(b) by 180 days.

(21) Appl. No.: 13/316,914

(22) Filed: Dec. 12, 2011

(65) Prior Publication Data

US 2012/0159930 A1    Jun. 28, 2012

Related U.S. Application Data

(60) Provisional application No. 61/426,150, filed on Dec. 22, 2010.

(51) Int. Cl.
*F01N 3/00* (2006.01)
*F01N 9/00* (2006.01)

(52) U.S. Cl.
CPC .............. *F01N 9/002* (2013.01); *F01N 2550/04* (2013.01); *F01N 2560/06* (2013.01); *F01N 2560/12* (2013.01); *Y02T 10/47* (2013.01)

(58) Field of Classification Search
CPC . F01N 9/002; F01N 2550/04; F01N 2560/12; F01N 2560/06; Y02T 10/47
USPC .................................................. 60/274–324
See application file for complete search history.

(56) References Cited

U.S. PATENT DOCUMENTS

| | | | |
|---|---|---|---|
| 4,656,832 A | 4/1987 | Yukihisa et al. | |
| 4,897,096 A | 1/1990 | Pischinger et al. | |
| 6,107,603 A | 8/2000 | Dementhon et al. | |
| 6,432,168 B2 | 8/2002 | Schönauer | |
| 6,964,694 B2 | 11/2005 | Rauchfuss et al. | |
| 7,157,919 B1 * | 1/2007 | Walton | 324/641 |
| 7,412,889 B2 | 8/2008 | Daoud | |
| 7,474,953 B2 | 1/2009 | Hülser et al. | |
| 7,603,252 B2 * | 10/2009 | Lee et al. | 702/155 |

(Continued)

FOREIGN PATENT DOCUMENTS

| | | |
|---|---|---|
| DE | 19827358 | 6/1998 |
| DE | 10160944 | 12/2001 |

(Continued)

*Primary Examiner* — Jesse Bogue
(74) *Attorney, Agent, or Firm* — Liell & McNeil Attorneys, PC

(57) ABSTRACT

Operating an exhaust particulate filter system for an internal combustion engine includes transmitting electromagnetic energy, for example having a frequency above about 2 GHz, through an exhaust particulate filter containing trapped soot. The transmitted electromagnetic energy may be attenuated in response to the trapped soot, and a filter soot loading value calculated based at least in part upon a correlation among an attenuation of the electromagnetic energy, a temperature of the filter, and a mass of the trapped soot. An algorithm based upon a partial derivative of an equation representing the correlation may be used in calculating the filter soot loading value, and a resulting soot mass. The calculated soot mass is used to determine a relative soot loading state of the filter in conjunction with information as to ash loading. Responsive to determining the relative soot loading state satisfies regeneration suitability conditions, a regeneration initiation command may be outputted.

20 Claims, 8 Drawing Sheets

(56) References Cited

U.S. PATENT DOCUMENTS

| | | | |
|---|---|---|---|
| 7,707,875 B2 | 5/2010 | Lee | |
| 8,069,658 B2* | 12/2011 | He et al. | 60/295 |
| 8,161,738 B2* | 4/2012 | He et al. | 60/296 |
| 2007/0089399 A1 | 4/2007 | Rhodes et al. | |
| 2007/0089478 A1 | 4/2007 | Wirth et al. | |
| 2007/0101705 A1* | 5/2007 | Knitt | 60/295 |
| 2007/0169469 A1* | 7/2007 | Knitt | 60/295 |
| 2007/0245721 A1* | 10/2007 | Colignon | 60/288 |
| 2007/0251221 A1 | 11/2007 | Lueschow et al. | |
| 2008/0048681 A1 | 2/2008 | Birkhofer et al. | |
| 2008/0087007 A1 | 4/2008 | Konstandopoulos | |
| 2008/0087101 A1 | 4/2008 | Konstandopoulos | |
| 2008/0105567 A1 | 5/2008 | Okayama et al. | |
| 2008/0264039 A1 | 10/2008 | Lattin et al. | |
| 2008/0282682 A1 | 11/2008 | C. et al. | |
| 2008/0307770 A1 | 12/2008 | Brahma et al. | |
| 2009/0038288 A1 | 2/2009 | Tachimoto et al. | |
| 2009/0217737 A1 | 9/2009 | Dorfmueller et al. | |
| 2009/0241520 A1 | 10/2009 | Gendron et al. | |
| 2009/0301058 A1 | 12/2009 | Boehler et al. | |
| 2009/0309571 A1 | 12/2009 | Katsuyama et al. | |
| 2010/0101409 A1* | 4/2010 | Bromberg et al. | 95/8 |
| 2010/0102828 A1* | 4/2010 | Bromberg et al. | 324/639 |
| 2012/0017570 A1* | 1/2012 | Kulkarni et al. | 60/277 |
| 2012/0159929 A1* | 6/2012 | Snopko et al. | 60/274 |
| 2012/0291419 A1* | 11/2012 | Snopko et al. | 60/274 |

FOREIGN PATENT DOCUMENTS

| | | |
|---|---|---|
| DE | 10209755 | 3/2002 |
| DE | 10316809 | 4/2003 |
| DE | 102005016132 | 4/2005 |
| DE | 102006028426 | 6/2006 |
| DE | 102007021913 | 5/2007 |
| DE | 102008014509 | 3/2008 |
| EP | 0525566 | 10/1995 |
| EP | 1624166 | 7/2007 |
| EP | 2131016 | 12/2009 |
| FR | 2805347 | 8/2001 |
| FR | 2848600 | 6/2004 |
| FR | 2910128 | 6/2008 |
| FR | 2917168 | 12/2008 |
| FR | 2918708 | 1/2009 |
| GB | 2395567 | 4/2006 |
| JP | 58020919 | 2/1983 |
| JP | 2005042617 | 2/2005 |
| JP | 2006046281 | 2/2006 |
| JP | 2009209833 | 9/2009 |
| WO | 9308382 | 4/1993 |
| WO | 2004016919 | 8/2002 |
| WO | 2006027287 | 9/2004 |
| WO | 2009043711 | 9/2007 |

* cited by examiner

EXHAUST PARTICULATE FILTER SYSTEM AND OPERATING METHOD THEREFOR

CROSS REFERENCE TO RELATED APPLICATIONS

This application claims the benefit of the filing date of U.S. Provisional Application Ser. No. 61/426,150, filed Dec. 22, 2010.

TECHNICAL FIELD

The present disclosure relates generally to exhaust particulate filter systems of the type used in connection with internal combustion engines, and relates more particularly to regenerating an exhaust particulate filter system in response to an attenuation of electromagnetic energy and an amount of trapped ash.

BACKGROUND

A great many different types of aftertreatment systems have been used in connection with internal combustion engines for decades. In many instances, it is desirable to remove particulates in exhaust from internal combustion engines, and exhaust particulate filters or "traps" are widely used for this purpose. While many exhaust particulate filters are quite effective at trapping soot, eventually the quantity of trapped soot reaches a point at which continued operation of the engine becomes problematic or less efficient, or risks damaging the exhaust particulate filter. "Regeneration" is a term generally used to describe the process of cleansing an exhaust particulate filter of trapped soot. One typical approach involves raising the temperature within the filter to a point sufficient to combust the trapped soot and convert it into less undesirable or more readily treated emissions.

A number of different regeneration techniques are well known and widely used. Among these are the use of catalysts resident within an exhaust particulate filter or carried within the engine fuel. Catalysts can assist in combustion of soot at relatively lower temperatures than what might otherwise be required. Other regeneration techniques rely upon injection of a fuel into the exhaust gases, which subsequently ignites upstream of, or upon entering the exhaust particulate filter to increase the temperature therein. Still other techniques utilize in-cylinder dosing or dosing downstream the engine and upstream the filter, to deliver a fuel which raises filter temperature by way of an exothermic reaction without actually igniting. Electrically powered heaters and the like, unconventional engine timing and/or fueling techniques, and back-pressure generating flow restrictors are also used. Regeneration technologies utilizing catalysts tend to be quite expensive, whereas techniques employing electric heaters or specialized engine operation strategies may siphon off energy from the engine. Delivery of fuel into the exhaust gases directly consumes fuel, whereas generating back pressure can reduce the ease with which exhaust gases exit the engine. It will thus be readily apparent that most, if not all, regeneration strategies carry some sort of cost or efficiency penalty.

In many regeneration strategies it is thus desirable to detect an amount of trapped soot within the filter with relative precision and accuracy. On the one hand, it is typically desirable to avoid operating an engine system with an inordinately packed filter, while on the other hand it is desirable to avoid overuse of energy and/or reactant-consuming regeneration strategies. For these reasons, engineers are continually seeking techniques to more accurately and precisely detect an actual amount of trapped soot so that underuse and overuse of regeneration can be avoided. Even seemingly miniscule improvements in detecting soot load, and thus suitable regeneration conditions, can translate into significant real world gains in efficiency.

One general class of soot detection technologies employs electromagnetic energy transmitted through an exhaust particulate filter, and reduced in strength as a portion of the electromagnetic energy is absorbed by trapped soot. These techniques have been known for a number of years, but have yet to achieve their full theoretical potential. Certain of these strategies seek to detect soot based upon observation of phenomena such as frequency shift or other signal attributes in electromagnetic energy transmitted through trapped soot. Others have sought to link the extent of reduction in signal strength to soot amount. One example strategy for leveraging electromagnetic energy loss in response to trapped soot is taught in U.S. Pat. No. 5,497,099 to Walton. These known techniques tend to be computationally challenging, require the use of relatively expensive and complex hardware, or suffer from other shortcomings. Moreover, strategies which appear to perform acceptably in the lab are often discovered to be poorly suited to actual field conditions.

SUMMARY OF THE DISCLOSURE

In one aspect, a method of operating an exhaust particulate filter system for an internal combustion engine includes transmitting electromagnetic energy through an exhaust particulate filter containing trapped soot and ash, and attenuating the transmitted electromagnetic energy in response to the trapped soot. The method further includes determining an ash value indicative of an amount of the trapped ash, and outputting a regeneration suitability signal responsive to an attenuation of the transmitted electromagnetic energy and the amount of trapped ash.

In another aspect, an exhaust particulate filter system for an internal combustion engine includes an exhaust particulate filter including a housing having an exhaust inlet, an exhaust outlet, and a filter medium configured to trap soot and ash in exhaust from the internal combustion engine passing between the exhaust inlet and the exhaust outlet. The system further includes a particulate monitoring system having a transmitter coupled with the exhaust particulate filter and configured to transmit electromagnetic energy through the exhaust particulate filter, and a receiver coupled with the exhaust particulate filter and configured to sense transmitted electromagnetic energy. The control system further includes a data processor coupled with the transmitter and the receiver and configured to receive data indicative of an attenuation of the transmitted electromagnetic energy in response to trapped soot, the data processor being further configured to determine an ash value indicative of an amount of trapped ash within the exhaust particulate filter, and output a regeneration suitability signal responsive to the attenuation and the amount of trapped ash.

In still another aspect, a method of operating an exhaust particulate filter for an internal combustion engine includes transmitting electromagnetic energy at a transmission strength through an exhaust particulate filter containing trapped soot and ash, the transmitted electromagnetic energy having a frequency greater than about 2 GHz, and sensing a reduced strength of the transmitted electromagnetic energy after attenuating the transmitted electromagnetic energy in response to the trapped soot. The method further includes determining an ash value indicative of an amount of the trapped ash, and outputting a signal responsive to the amount of trapped ash and to a difference between the transmission strength and the reduced strength.

DETAILED DESCRIPTION

Figure 1:
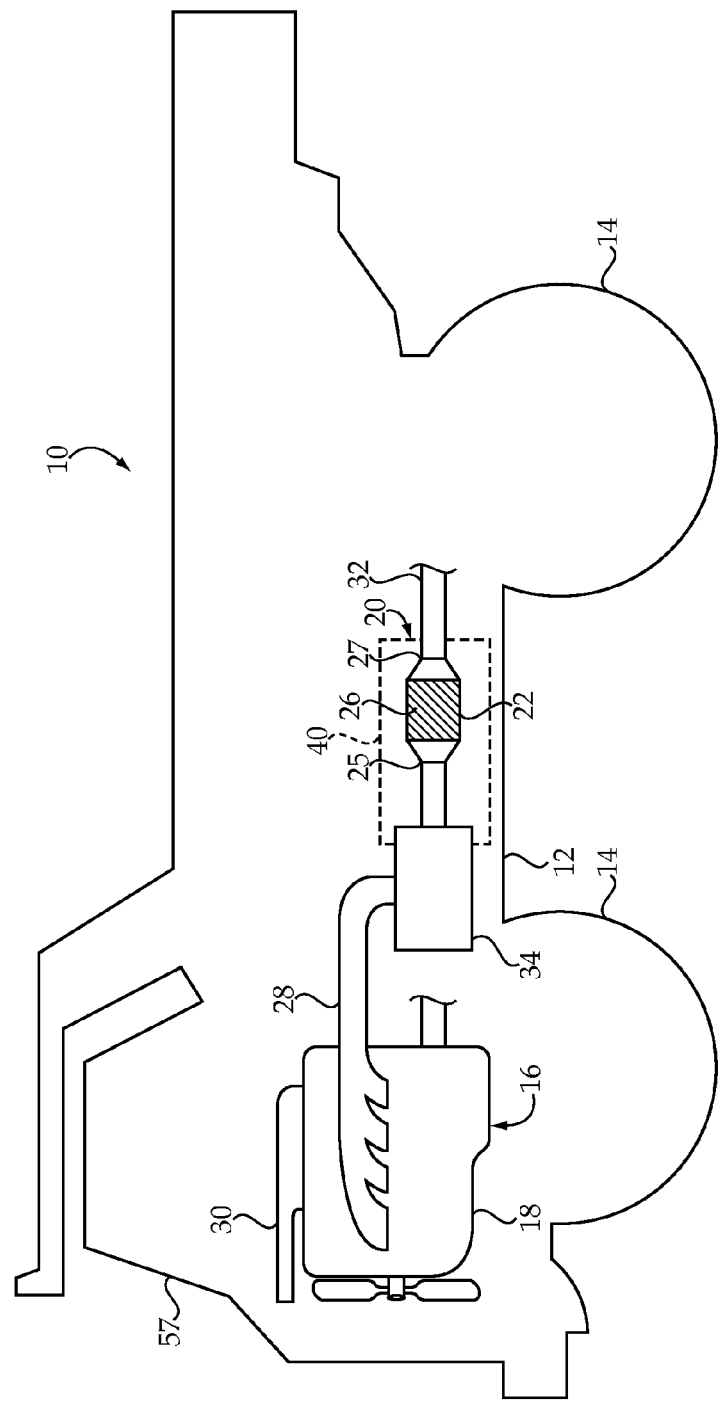
FIG. 1 is a side diagrammatic view of a machine according to one embodiment.

Referring to FIG. 1, there is shown a machine 10 according to one embodiment. Machine 10 is shown in the context of an off-highway truck having a frame 12, and ground engaging elements 14 coupled with frame 12. In other embodiments, machine 10 might include a track-type machine having ground engaging tracks rather than propulsion wheels, or still another type of machine such as a motor grader, a backhoe, a wheel loader, a scraper, or even a marine vessel. Machine 10 might also include a stationary machine such as a generator, compressor or a pump. Machine 10 may be equipped with an engine system 16 coupled with frame 12 and including an internal combustion engine 18 such as a compression ignition diesel engine, providing motive power to ground engaging elements 14. An exhaust particulate filter system 20 may also be coupled with frame 12, and includes an exhaust particulate filter 22 fluidly connected with engine 18 to trap particulates such as soot and ash in engine exhaust. As will be further apparent from the following description, exhaust particulate filter system 20 may be uniquely configured for detecting soot trapped in filter 22, and responsively controlling filter regeneration.

Filter 22 may include a canister or housing 24 having an exhaust inlet 25 fluidly connected with an exhaust conduit 28 coupled with engine 18 in a conventional manner, and an exhaust outlet 27 coupled with an outlet conduit 32, in turn connecting with an exhaust stack or tailpipe (not shown) in a conventional manner. A regeneration mechanism 34 may be positioned fluidly between engine 18 and filter 22 to enable regeneration of filter 22 in a manner and under circumstances further described herein. A diesel oxidation catalyst 51 may also be located fluidly between engine 18 and filter 22. In certain embodiments, a Selective Catalytic Reduction ("SCR") module might also be coupled with filter system 20. A filter medium 26 is positioned within housing 24, and configured for trapping particulates such as soot and ash in exhaust from engine 18. Filter system 20 may further include a control system 40 for filter 22, which includes a variety of components having features and functions further described herein.

Figure 2:
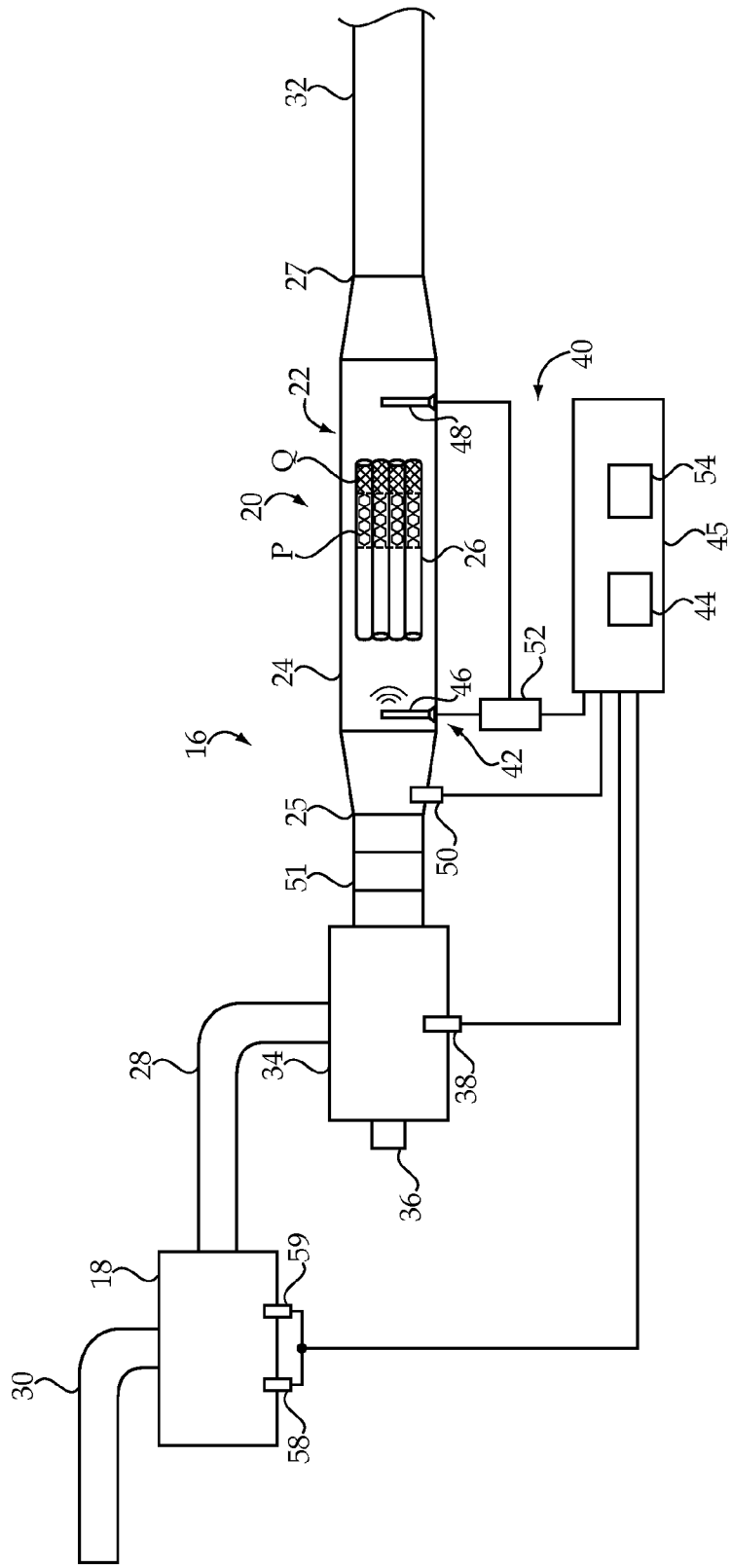
FIG. 2 is a side diagrammatic view of an engine system suitable for use with the machine of FIG. 1.

Referring also now to FIG. 2, there are shown certain components and features of engine system 16 in further detail. As noted above, regeneration mechanism 34 may be configured to regenerate filter 22, for example when an amount of trapped soot in filter 22 exceeds a desired threshold. Those skilled in the art will be familiar with the general phenomena of soot particles being trapped within a filter medium of an exhaust particulate filter. Over time, soot may accumulate to a point that filter efficacy tends to degrade, exhaust back pressure is elevated, and/or a risk of filter damage created if the trapped soot is not removed. In the present disclosure, filter medium 26 may include any of a wide variety of different filter media types, such as a ceramic filter medium like cordierite, a silicone carbide filtration medium, or still another type of filter medium. Replaceable filter cartridges or a monolithic filter medium may be used without departing from the scope of the present disclosure. Further still, filter medium 26 might include resident catalyst materials, or catalyst might be carried in the engine fuel or otherwise supplied, to assist in combustion of soot. In any event, in one embodiment regeneration mechanism 34 may include an air inlet 36 for supplying air into a stream of exhaust gases passing between conduit 28 and filter 22. Regeneration mechanism 34 may also include a fuel delivery device such as a fuel nozzle 38 or other fuel delivery mechanism for supplying a fuel such as liquid diesel distillate into the exhaust gases to combust, and thereby raise the temperature of gases passing to filter 22 to initiate and/or maintain combustion of soot trapped therein. Rather than the described strategy of supplying fuel from combustion into the exhaust gases, any other suitable regeneration technique such as a dosing system or a back pressure generating flow restrictor downstream filter 22 might be used.

Control system 40 may further include a sensing mechanism 42 and a data processor 44 coupled with sensing mechanism 42 and configured to receive inputs from sensing mechanism 42. Data processor 44 may be part of an electronic control unit 45 which includes a dedicated filter control unit, but which might also comprise an engine control unit. In other words, electronic control unit 45 may be configured to monitor and control filter system 20 but might additionally be configured to monitor and control operating aspects of engine 18 as well as other components of system 16 and/or machine 10. A computer readable memory 54 may be coupled with data processor 44, and stores computer readable code executed by data processor 44. The computer readable code may include a soot detection and/or regeneration control algorithm, the significance of which will be further apparent from the following description. Memory 54 may include any form of suitable memory such as a hard drive, flash memory or the like.

In one embodiment, sensing mechanism 42 may include a soot sensor having a computer 52 in communication with electronic control unit 45, and also including a transmitter 46 and a receiver 48 positioned within housing 24 and configured to transmit and receive, respectively, electromagnetic energy. Each of transmitter 46 and receiver 48 may include an antennae capable of either transmitting or receiving electromagnetic energy as is known in the art. Computer 52, including its own data processor, may be configured to output signals to electronic control unit 45 encoding data indicative of an attenuation of electromagnetic energy transmitted through filter medium 26 via transmitter 46 and received or sensed via receiver 48. Attenuation of the transmitted electromagnetic energy may be indicative of a relative soot loading state of filter 22, such that data processor 44 may command operation of regeneration mechanism 34 responsive to the relative soot loading state of filter 22 and to other factors further described herein.

In one practical implementation strategy, the electromagnetic energy transmitted through filter 22 may include a series of discrete pulses transmitted via transmitter 46 and received via receiver 48. The pulses may be transmitted at a transmission strength, and sensed at a reduced strength after being attenuated in response to trapped soot. Each of the discrete pulses may include a different frequency such that a collection of frequencies, in one embodiment defining a continuous frequency band, are transmitted through filter medium 26 via transmitter 46 and received via receiver 48. One example protocol includes transmitting a one millisecond pulse at a first frequency, followed by a second one millisecond pulse at a different frequency, followed by a third one millisecond pulse at yet another frequency, and so on, until a frequency band of about 200 megahertz (MHz) has been transmitted and received. In one embodiment, the collection of transmitted frequencies may include frequencies greater than about 2 gigahertz (GHz). More particularly, the transmitted frequencies may be between about 2.0 GHz and about 2.5 GHz, and in one practical implementation strategy may be between about 2.1 GHz and about 2.2 GHz. As used herein, the term "about" should be understood in the context of a number of significant digits. Thus, about 2 GHz means between 1.5 GHz and 2.4 GHz, about 2.1 GHz means between 2.05 GHz and 2.14 GHz, and so on. A difference between transmitted strength of each of the pulses and received strength of each of the pulses may be encoded in outputs from computer 52 to data processor 44. Such outputs will thus be understood as indicative of attenuation of electromagnetic energy transmitted through filter medium 26. Data processor 44 may receive the outputs from computer 52 and responsively determine a relative soot loading state of filter 22. In one embodiment, computer 52 or data processor 44 may calculate a mean attenuation value for the collection of frequencies in the described frequency band, and determine relative soot loading state based on a difference between the mean value and a previous mean value, in a time interval, as further described herein. Certain techniques for determining a relationship between attenuation of electromagnetic energy and relative soot loading state are known in the art. By way of the teachings set forth herein, calculation of relative soot loading state with superior accuracy and superior control over filter regeneration timing to attain greater engine system efficiency than that available with conventional techniques will be possible.

Sensing mechanism 42 may further include a temperature sensor 50 such as a temperature sensor configured to sense an inlet or intake temperature of filter 22 and output temperature data indicative of filter temperature to data processor 44. Temperature within an exhaust particulate filter can affect the extent to which electromagnetic energy is attenuated when transmitted through a filter medium containing trapped soot. In general, the attenuation is correlated with temperature, with a notable exception discussed further herein. Thus, higher temperature can mean greater attenuation, i.e. reduced strength of received electromagnetic energy. Other factors pertinent to the accuracy of soot detection may also vary responsive to temperature, and thus data processor 44 may be configured to determine a relative soot loading state of filter 22 in response to attenuation of the transmitted electromagnetic energy, temperature, and still other factors further described herein.

In addition to attenuation and temperature, determining relative soot loading state according to the present disclosure may be based in part upon information as to a relative ash loading state of filter 22. To this end, data processor 44 may be further configured to determine an ash value indicative of an amount of trapped ash within filter 22, and output a signal such as a regeneration suitability signal responsive to attenuation of the transmitted electromagnetic energy and the amount of trapped ash. As discussed above, data processor 44 may receive or calculate a mean attenuation value which is based on a difference between a transmission strength and a received strength of the electromagnetic energy at the collection of electromagnetic frequencies. Based at least in part upon the mean attenuation value and the ash value, data processor may determine a soot value indicative of a relative soot loading state of filter 22, and compare the soot value with a stored reference value. In one embodiment, the determined soot value may include a value indicative of soot grams per liter of available filter volume, and the stored reference value may include a stored reference value such as "x" grams soot per liter of available filter volume. The stored reference value may indicate a relative soot loading state at which regeneration is appropriate. Data processor 44 may compare the determined soot value with the stored reference value, and output the regeneration suitability signal responsive to a difference between the compared values. It will thus be understood that, in general terms, data processor 44 may determine suitability of regeneration of filter 22 based upon information about soot loading and also upon information about ash loading in filter 22, and in certain embodiments based also in part upon information as to filter temperature as further described herein.

It has been discovered that accumulation of ash within an exhaust particulate filter can impact attempts to accurately detect soot. The influence of ash on the accuracy of soot detection can in turn affect the ability to optimally time filter regeneration. In FIG. 2, a first zone Q of filter medium 26 is substantially filled with ash, whereas a second zone P of filter medium 26 contains trapped soot. As ash builds up over time during operating engine system 16, an available volume of filter 22 for trapping soot may decrease. Thus, where zone Q is relatively larger, a relatively lesser proportion of filter 22 is available for containing trapped soot. For instance, with an ash-free filter or a filter nearly ash-free, substantially all of a volume of filter 22 apart from hardware positioned therein is available to contain trapped soot. The accumulation of ash over many hours of engine operation, however, will tend to decrease the available filter volume for containing trapped soot. As a result, filter 22 can reach a threshold soot loading state at which regeneration is desirable relatively more quickly under higher ash loading conditions than under lower ash loading conditions. For optimal operation, the frequency of filter regeneration may need to increase over time as greater and greater amounts of ash accumulate within filter 22, at least until ash cleanout is performed. Computer readable memory 54 may further store information such as total filter volume which data processor 44 can use to determine the soot value mentioned above. In one embodiment, the determined soot value may include a value indicative of a ratio of trapped soot to available filter volume. Based on information as to ash amount, soot amount, and total filter volume, data processor 44 can calculate, estimate, or infer the ratio of trapped soot to available filter volume, or a value indicative of the ratio. The soot value might be calculated directly or determined by way of a map, for example. The present disclosure leverages the foregoing insights as to the relationship between ash loading and optimal regeneration timing to improve efficiency over earlier designs in which one-size-fits-all approaches were commonly used regardless of a quantity of trapped ash.

A variety of strategies are contemplated herein for providing data processor 44 with information as to an ash loading state of filter 22. In one embodiment, ash loading may be estimated based at least in part upon data as to fuel consumption and fuel type. For instance, certain biodiesel fuels and blends tend to generate a relatively larger amount of ash for a given volume of fuel consumed than do conventional diesel fuels. In other instances, ash loading might be estimated based upon engine running time since the most recent ash cleanout. In still other instances, an ash value might be calculated by data processor 44 or another onboard engine computer. One example of calculating a value indicative of a relative amount of trapped ash within an exhaust particulate filter is taught in copending and commonly owned U.S. patent application Ser. No. 12/841,308.

It has further been discovered that accuracy in determining the ratio of trapped soot to available filter volume can be impacted by variance in the attenuation of the transmitted electromagnetic energy. Such variance may take the form of excursions resulting from very high or very low attenuation, or zero attenuation, at one or more particular electromagnetic frequencies. It will be recalled that a frequency sweep across a band of electromagnetic frequencies may be used in one practical implementation strategy. Filter 22 and/or the particulates trapped therein may respond differently to certain frequencies within the frequency band, and in some instances the varying responses may be extreme enough that accuracy of soot detection could be compromised unless something is done to compensate. One example where the determined soot value could be reduced in accuracy by excursions would be where one or more of the transmitted electromagnetic frequencies includes a resonance frequency of filter 22. Embodiments are contemplated where the collection of transmitted frequencies, by design, does not include resonance frequencies of filter 22. In a related implementation strategy, the electromagnetic frequency sweep transmitted via transmitter 46 might skip over one or more resonance frequencies. Resonance frequencies may vary from filter to filter, and can even shift over time and/or in response to accumulation of particulates in a given filter or other factors. In many instances, the actual resonance frequencies of a filter may be difficult to determine, especially under field conditions. One further practical implementation strategy thus includes transmitting a collection of electromagnetic frequencies including at least one resonance frequency of filter 22, and a plurality of other, non-resonance frequencies. The strategy used with any particulate filter might include transmitting one or two resonance frequencies, and transmitting over one hundred non-resonance frequencies. This general strategy of predominating the collection of electromagnetic frequencies with non-resonance frequencies enables the determination of the soot value to be desensitized to resonance-induced excursions in the data indicative of attenuation. Another way to understand this principle is that specific frequencies, a frequency range, number, or diversity of frequencies may be chosen such that data indicative of attenuation at non-resonance frequencies can be expected to overwhelm any data indicative of attenuation at resonance frequencies. In other words, calculating a mean attenuation value can ensure that relatively extreme excursions in the data will not substantially impact the end result. Still other embodiments might filter the data indicative of attenuation to throw out or modify data departing from an average by a certain degree, and then an adjusted mean value determined which serves as the basis for soot detection.

Figure 3:
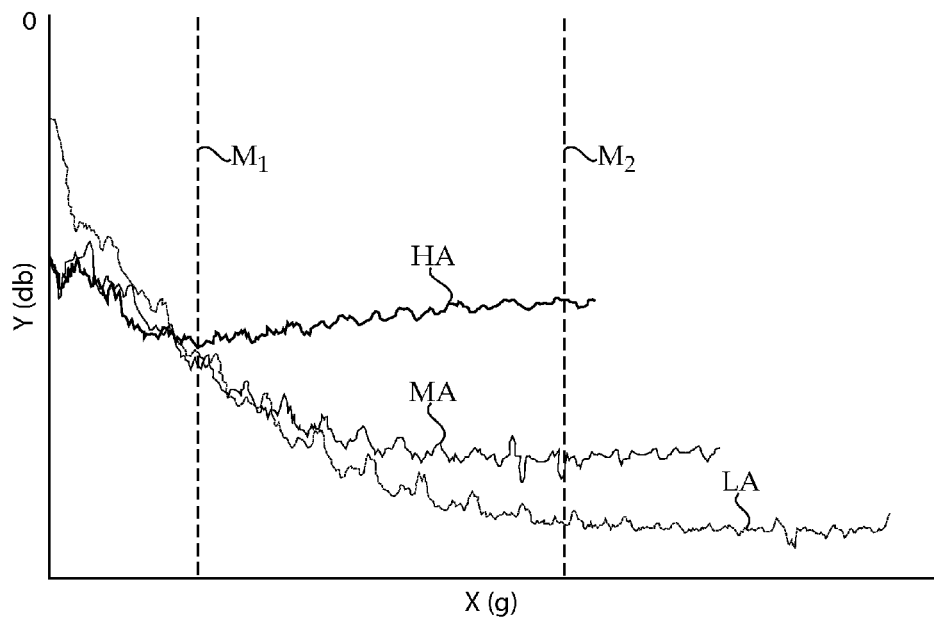
FIG. 3 is a graph illustrating attenuation compared to soot mass for three different ash loading states of an exhaust particulate filter system according to the present disclosure.

Referring now to FIG. 3, there is shown a graph of a mean attenuation of electromagnetic energy for a collection of frequencies with respect to a mass of trapped soot within an exhaust particulate filter such as filter 22. Three different signal traces are shown, including a first trace LA corresponding to a low ash condition of exhaust particulate filter 22, a second trace MA corresponding to a medium ash condition, and a third trace HA corresponding to a high ash condition. It may be noted that each of the signal traces has a different profile, illustrating a different response of filter 22 and particulates trapped therein to the same collection of transmitted electromagnetic frequencies under different relative amounts of trapped ash. In other words, LA, MA, and HA, might result from monitoring three different soot loading cycles of filter 22 at three different times, and where a relative amount of trapped ash is different at each of the three different times. Given the relatively slow rate of accumulation of ash as compared to the rate of accumulation of soot, the time periods during which the data represented in traces LA, MA, and HA is obtained may be separated by hundreds of hours of engine operation. In the illustrated embodiment, signal trace LA represents an example 0% ash loading state, signal trace MA represents an example 50% ash loading state, and signal trace HA represents an example 100% ash loading state. It should be appreciated that a 50% ash loading state, for example, does not necessarily mean that 50% of the volume of filter 22 is filled with ash, but instead means that filter 22 has trapped about one half of an intended ash loading capacity.

It may also be noted that signal trace HA has an inflection point, or minimum value approximately at a soot mass $M_1$, while signal trace MA has an inflection point, or minimum value approximately at a soot mass $M_2$. Signal trace LA does not appear to reach an inflection point/minimum valve in FIG. 3. Signal trace LA could nevertheless be expected to reach an inflection point/minimum value if measurements were continued with increasing soot mass beyond what is shown in FIG. 3, although it might not be desirable to subject filter 22 to such conditions for reasons which will be readily apparent to those skilled in the art. The inflection points/minimum values of the signal traces may be understood as saturation points beyond which a response of filter 22 and particulates trapped therein to the transmitted electromagnetic energy may cease to show any greater attenuation. This is believed to be the result of additional accumulation of soot "shielding" already trapped soot from the transmitted electromagnetic energy such that the electromagnetic energy "sees" a reduced amount of soot with increased soot accumulation. It may be noted that the saturation points of the differently profiled signal traces occur at different masses of trapped soot. This is believed to be due to soot packing to a relatively denser soot cake more quickly under higher ash loading conditions than lower ash loading conditions. It may also be noted that due to trapped ash occupying volume within filter 22, the mass of soot indicated by the data associated with any one of signal traces LA, MA, and HA, will typically correspond to a different ratio of trapped soot mass to available filter volume.

Each of signal traces LA, MA, and HA, is relatively irregular. While some signal trace irregularity, if only noise, might be expected in virtually any soot detection strategy, the roughly periodic rises and falls in each of signal traces LA, MA, and HA result at least in part from changes in filter temperature. At relatively higher temperatures attenuation of electromagnetic energy in response to trapped soot may be greater than attenuation at relatively lower temperatures. For example, at a lower temperature "T–1" a strength of transmitted electromagnetic energy might be reduced by an amount "X" when transmitted through trapped soot of mass "Y", whereas at a higher temperature "T" a strength of the transmitted electromagnetic energy might be reduced by an amount "X+1" when transmitted through trapped soot of mass "Y". As a mass of trapped soot changes, however, the nature and degree of the effect of temperature upon attenuation may also change. It has been discovered that as a mass of trapped soot increases, the extent to which temperature impacts attenuation of electromagnetic energy transmitted through the soot may also increase. This relationship is subtly apparent in FIG. 3. It may be noted that rises and falls in traces LA, MA, and HA continue with increasing soot mass even though the overall signal is on the average flattening out. In the case of trace LA, perhaps best illustrating the relationship between temperature dependent attenuation and soot mass, temperature excursions are evident in the form of rises and falls even as the trace flattens beyond mass $M_2$. It has also been discovered that in at least certain instances, the effect of temperature on attenuation beyond the saturation point may reverse. Compensating for the changing impact of temperature on attenuation with increasing soot may be leveraged in soot detection according to the present disclosure, and is discussed in more detail below. Another way to understand these principles is that, in at least certain systems and for certain frequencies of electromagnetic energy, attenuation may be coupled with soot mass, but also coupled with temperature, and the extent and nature of the effect of temperature on attenuation may itself be coupled with soot mass.

In view of the foregoing discussion, those skilled in the art will appreciate that the factors of temperature, attenuation, and soot mass are cross coupled in various ways. Those skilled in the art will further appreciate that two sets of similar or identical data as to attenuation of electromagnetic energy, for example quantified attenuation data in decibels, could actually represent two different masses of trapped soot due to the cross coupled relationships. In other words, the same attenuation of "Z" decibels might be observed at different combinations of soot mass and temperature. Moreover, due to variation in available filter volume as an amount of trapped ash changes, a given determination of a mass of trapped soot may not be sufficient information to optimally time regeneration. The present disclosure encompasses strategies capable of detecting soot, and timing filter regeneration with a relatively high degree of accuracy and in a manner which accounts for the various interdependent relationships discussed herein. These capabilities are made possible at least in part by way of a discovered correlation among attenuation of electromagnetic energy, filter temperature, and a mass of trapped soot. Temperature in the subject correlation may be soot temperature, which is typically intermediate exhaust temperature and substrate temperature. Since sensing soot temperature directly may not always be practicable, sensing of filter inlet temperature may be used, with compensation for a difference between sensed inlet temperature and soot temperature performed, as further described herein. Temperature might also be modeled rather than sensed in certain implementations of soot detection using the subject correlation. One expression of the correlation is by way of the equation:

$$S = A * 10^{\left(\frac{-soot(g)*T(K)}{B}\right)} + C$$

Where:
S=attenuation;
A=effective filter volume; and
B and C are constants.

The correlation expressed in the above equation, and further and/or more refined expressions of the general mathematical relationship, enables data processor 44 to calculate a filter soot loading value which is indicative of a mass of trapped soot within filter 22, a change in the mass of trapped soot, or a rate of change in the mass of trapped soot. Data processor 44 may record the determined filter soot loading value on computer readable memory 54, for example for use in timing filter regeneration. It will be recalled that data processor may calculate a "soot value" as discussed above. The "soot value" may or may not be the same as the "filter soot loading value." Certain of the methodologies disclosed herein are expected to be broadly applicable to soot detection and filter regeneration regardless of whether soot detection based on the above correlation is carried out. Thus, in some instances, where the above correlation is leveraged in soot detection, the "soot value" and the "filter soot loading value" might be the same, whereas in other instances where a different soot detection technique is used, the two terms may not necessarily be interchangeable.

The calculated filter soot loading value may be used to determine suitability of conditions for regenerating filter 22, or for other purposes such as simply calculating a mass of soot within filter 22 or a ratio of soot mass to effective or available filter volume, at any given time. Based at least in part upon the above correlation, a single value "S" indicative of attenuation of one or more frequencies of electromagnetic energy, a single temperature input "T" indicative of a temperature such as inlet temperature in filter 22, and empirically determined values for A, B and C, may be used to calculate a mass of trapped soot within filter 22. In such an example implementation, the calculated filter soot loading value may be, or be indicative of, the mass of trapped soot. Practical implementation strategies may nevertheless leverage versions of the above correlation relating changes in the various factors rather than discrete values, as further described herein.

Figure 4:
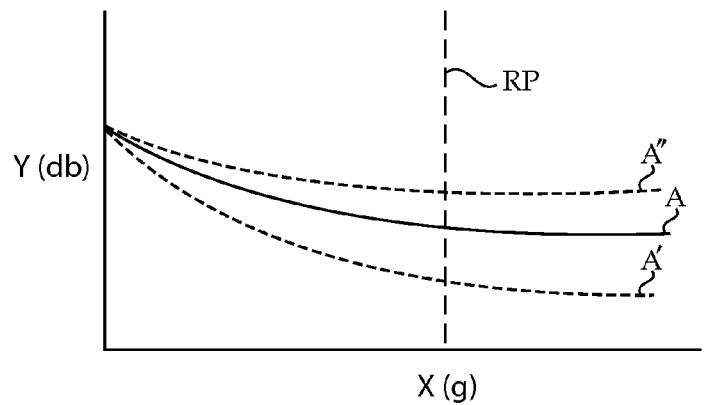
FIG. 4 is a graph illustrating attenuation compared to soot mass for three different filter conditions.

It will be recalled that available or "effective" filter volume may vary based upon accumulation of ash within filter 22. Accordingly, in the above equation A may be determined based upon information as to a total filter volume, and information as to a proportion of the total filter volume which is occupied by ash. A difference between the available filter volume and the volume occupied by ash is the available or effective filter volume. Referring to FIG. 4, there is shown a graph of attenuation relative to soot mass in which three different effective filter volume states are shown via curves A, A', and A". In FIG. 4, it may be assumed that the sole variable manipulated is effective filter volume. Curve A" indicates a relatively smaller effective filter volume, curve A indicates a medium effective filter volume, and curve A' indicates a relatively large effective filter volume. While curves A, A', and A" are normalized for illustrative purposes, it may be noted that they correspond approximately to signal traces MA, LA, and HA, respectively, of FIG. 3. Thus, as ash accumulates over time, an absolute value of A may be expected to decrease.

Figure 5:
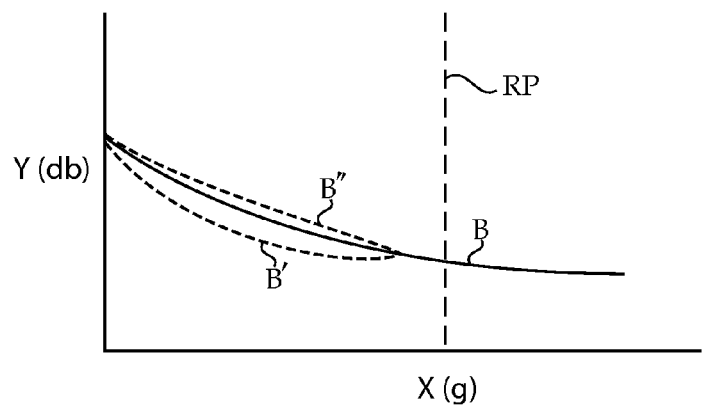
FIG. 5 is another graph illustrating attenuation compared to soot mass for three different filter conditions.

The constant B in the above equation may be understood as a frequency constant and based at least in part upon filter housing geometry and an average of the frequency of electromagnetic energy transmitted through filter 22. Referring to FIG. 5, there is shown a graph of attenuation relative to soot mass in which the effects of varying the constant B are illustrated while holding other factors equal. An incipient portion of the response curve may have a relatively steeper slope where the constant B is relatively small, shown as curve B' in FIG. 5. A relatively shallower slope may be expected where B is relatively large, shown via curve B", whereas a medium slope may be expected where B has a medium value, shown via curve B.

Figure 6:
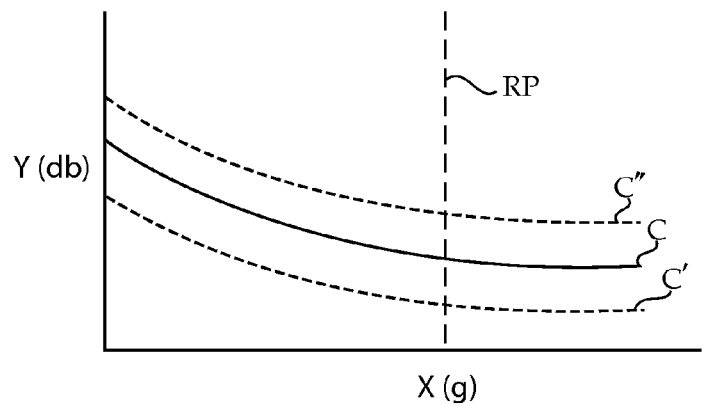
FIG. 6 is another graph illustrating attenuation compared to soot mass for three different filter conditions.

Constant C in the above equation may be understood as a clean calibration constant, and generally based on filter housing geometry and the geometry and properties of matter contained therein. FIG. 6 illustrates a graph of attenuation versus soot mass where the constant C is varied among a relatively low value, curve C', a medium value, curve C, and a relatively high value, curve C". Those skilled in the art will be familiar with the concept of "coupling" in electromagnetic frequency transmission between a transmitter and a receiver. In an ideal case, with perfect coupling, C would be equal to 0. With any real world filter, and where any article is placed within a filter, however, coupling will typically deviate from the ideal case. Accordingly, C may depend upon a clean calibration value of filter 22 at a chosen frequency or range of frequencies and for a given filter geometry. It may further be noted that curve C' captures a relatively lower range of attenuation values than curves C and C". Thus, varying the constant C can effectively vary a sensing range of the associated system. As further discussed herein, soot detection may be based on a mathematical relationship which is derived from the above equation, but where C is cancelled out.

A, B and C may thus represent numerical values which may be determined, or whose general ranges may be determined, by gathering empirical data for a given exhaust particulate filter system design. In each of FIGS. 4, 5 and 6, a line RP denotes an approximate soot mass at which regeneration may occur. Since regeneration timing may depend upon soot mass per liter of available filter volume, under different ash loading conditions the actual soot mass amount at which regeneration is desired may vary, as described herein, and thus lines RP might actually be at different relative locations on the respective graphs in a real world case. A, B and C may be manipulated by varying exhaust particulate filter system characteristics such that the profiles of attenuation, such as those shown in FIG. 3, are suited to particular system specifications such as desired soot mass detection range or electromagnetic energy strength sensing range. Where desired to sense relatively low signal strengths, A, B and C could be varied to ensure that the profile of attenuation does not flatten out or reverse and trend upward prior to reaching a low signal strength range. While B and C are described herein as being "constants," it should be appreciated that each of B and C may be hardware and frequency dependent, and may actually vary somewhat depending upon filter design and soot detection strategy. Moreover, while embodiments are contemplated in which B and C are in fact constant or very nearly so under otherwise fixed conditions, it has been observed that B and C can vary to a certain extent under different operating conditions such as different filter temperatures. Thus, in a research implementation where temperature changes were minimized or eliminated, B and C might behave as true constants. Since implementation of concepts set forth in the present disclosure will typically include conditions in which temperatures are changing within an exhaust particulate filter system, B and C may be calibrated during operation to account for temperature induced changes in their values. Thus, while B and C are described herein as "constants," they should be understood as numerical quantities whose values are at least theoretically unchanging under controlled laboratory conditions, but which will typically change and may need to be calibrated in actual service applications, as further described herein.

As alluded to above, the correlation as expressed in the foregoing equation might be used without modification in a soot detection algorithm executed by data processor 44. In a practical implementation strategy, however, the soot detection algorithm may be based at least in part upon a derivative of the foregoing equation such that a change in the attenuation is related to a change in the mass of trapped soot. By calculating a change in the mass of trapped soot based upon a change in the attenuation over a time interval, it is possible to calculate how much soot mass has increased in that time interval. In general terms, this enables data processor 44 to commence calculating soot amounts beginning at a clean filter state following regeneration where soot mass is known, and track changes in soot mass over succeeding time intervals until a soot mass is reached at which regeneration is appropriate. In one embodiment, data processor 44 may numerically integrate the calculated change in the mass of trapped soot for a time interval with changes in mass of trapped soot for preceding time intervals to calculate a total soot mass. It will be recalled that the filter soot loading value may include or be indicative of total soot mass. From the total soot mass or value indicative thereof, data processor 44 may determine a value indicative of a ratio of current soot mass to available filter volume, and compare the determined value with a stored threshold value in a manner similar to that discussed above. Responsive to comparing the determined value with the stored threshold value, data processor 44 may trigger filter regeneration, or alternatively determine that regeneration is not yet merited. Thus, a "regeneration suitability signal" as described herein might include a signal having a value equal to either zero or one, with a value equal to zero indicating no regeneration is to be commenced and a value equal to one triggering actions to initiate regeneration.

It has further been discovered that a soot detection algorithm executed via data processor 44 may be based at least in part upon a partial derivative of the foregoing equation varying attenuation with respect to soot mass but not varying attenuation with respect to temperature. Those skilled in the art will appreciate that the full derivative of the foregoing equation could express the relationships among a rate of change in attenuation, a rate of change in soot mass, and a rate of change in temperature. An embodiment utilizing a soot detection algorithm based upon the full derivative might be used. It has been discovered, however, that an acceptable degree of accuracy, and reduced computational complexity, can be obtained by treating temperature as a constant for certain purposes and basing the calculation of a change in soot mass for a given time interval upon a discrete temperature value rather than a change or rate of change in temperature. Thus, a non-linear correlation among a rate of change in soot mass, a rate of change in attenuation, and a discrete temperature may be used. In one practical implementation strategy, calculating a change in soot mass for a given time interval may be executed responsive to a temperature at the end of the time interval. As alluded to above, in addition to the "constants" B and C, calculation of soot mass, a change in soot mass, or a rate of change in soot mass, may be based upon additional coefficients developed empirically or theoretically. One empirically derived modification of the above equation, where "y" is attenuation and "m" is soot mass, is as follows:

$$y = C_1 * 10^{(-mT/C)} + C_3 + C_4 * 10^{(mT/C)_5}$$

In the above, modified equation $C_1$ is interchangeable with "A" from the first equation, $C_2$ is interchangeable with "B" from the first equation, $C_4$ and $C_5$ are additional hardware based coefficients, and $C_3$ is interchangeable with "C" from the first equation. The significance and further implementation of coefficients $C_1$, $C_2$, $C_4$ and $C_5$ in soot detection will be apparent from the following description, and as mentioned above $C_3$ may be removed from the calculation. In the above modified equation, the term $C_4*10^{(mT/C)}{}_5$ is a reflection/resonance term used to compensate for saturation as discussed herein. It will be recalled from the foregoing discussion of FIG. 3 that each of the signal traces HA and MA exhibits a saturation point, and that signal trace LA could be expected to exhibit a saturation point if extrapolated. The reflection/resonance term enables soot detection to continue and be acceptably accurate even where soot monitoring is performed beyond the saturation point. From the above, modified equation, taking the derivative of attenuation with respect to soot mass but not with respect to temperature yields the following partial derivative equation:

$$dy/dm = C_1*\ln(10)*(-T/C_2)*10^{(-mT/C)}{}_2 + C_4*\ln(10)*(T/C_5)*10^{(mT/C}{}_5)$$

The partial derivative equation reflects the additional insight that attenuation follows a $\log_{10}$ exponential decay profile. Transposing this equation to solve for dm, with dy=difference in attenuation, and inserting a gain term "K" multiplied through the whole equation yields:

$$dm = \frac{\text{mean attenuation} - \text{previous mean attenuation}}{C_1*2.3*-T/K*C_2*(10^{(-mT/K*C_2)}) + C_4*2.3*T/K*C_5*(10^{(mT/K*C_5)})}$$

The above partial derivative equation represent one example calculation which may be performed by data processor 44 to arrive at the described filter soot loading value. It is contemplated that many other equations, both simpler and more complex, might be deduced based upon the teachings set forth herein, and successfully implemented in an exhaust particulate filter system without departing from the scope of the present disclosure. Variations in hardware, filter geometry, electromagnetic frequency, and possibly still to be discovered factors may be best addressed by equations and/or algorithms which consider additional or alternative hardware based coefficients, or whose hardware based coefficients are calibrated based on factors other than or in addition to temperature, but whose principle underpinnings are similar to the general relationships disclosed herein.

INDUSTRIAL APPLICABILITY

Figure 7:
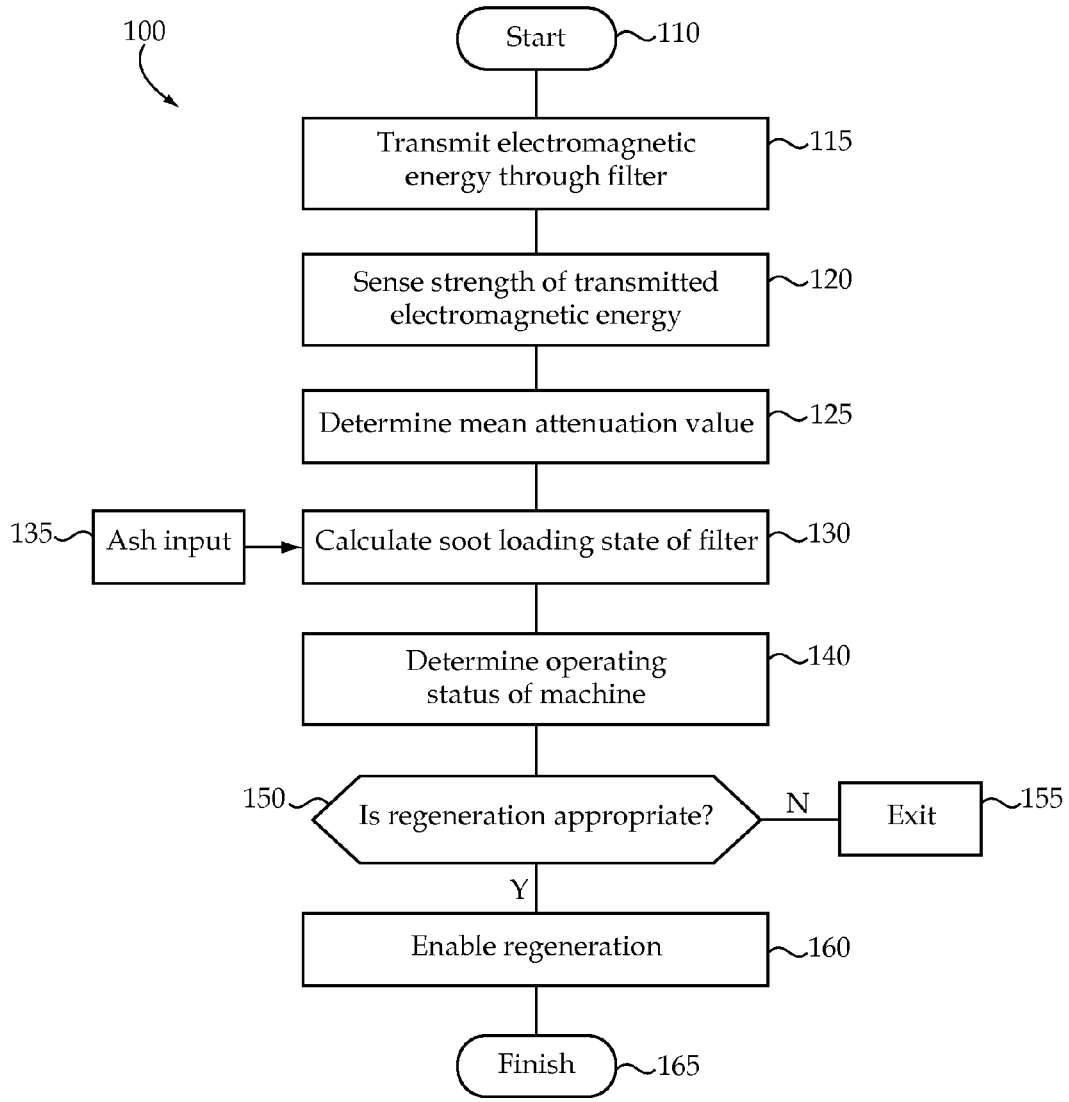
FIG. 7 is a flowchart illustrating an example process according to one embodiment.

Referring to FIG. 7, there is shown a flowchart 100 illustrating an example control process according to the present disclosure. The process of flowchart 100 may Start at step 110, and then proceed to step 115 at which electromagnetic energy is transmitted through filter 22. From step 115, the process may proceed to step 120 to sense a strength of transmitted electromagnetic energy. From step 120, the process may proceed to step 125 to determine a mean attenuation value for the transmitted electromagnetic energy as described herein. From step 125, the process may proceed to step 130 at which data processor 44 calculates a soot loading state of filter 22, which may include relative soot mass to available filter volume. As described herein, calculating the soot loading state may take place responsive to an ash input 135 including a value indicative of a relative ash loading state of filter 22. Further details and example illustration of the calculation at step 130 are further described below. From step 130, the process may proceed to step 140 to determine an operating status of machine 10.

Determining an operating status may include, for example, determining whether machine 10 is operating at a low speed and low load condition, such as might be indicated via inputs from an engine speed sensor 58 and an engine fueling sensor 59 as shown in FIG. 2. Step 140 may also determine whether machine 10 is operating at a high speed and/or high load condition, or some other combination of operating factors. From step 140, the process may proceed to step 150 to query whether regeneration is appropriate. At step 150, data processor 44 may be determining whether filter 22 is at a soot loading state suitable for regeneration, as well as whether machine 10 is in an operating state suitable for regeneration. In certain instances, step 150 might also include determining which of a plurality of available regeneration protocols is appropriate. For instance, if machine 10 is operating at a relatively low engine speed and a relatively low load, and has been doing so for a predefined period of time, it may be concluded that machine 10 is likely idling, and that conditions are suitable for one type of regeneration protocol. If, on the other hand, machine 10 is operating at a higher engine speed and load, the first regeneration protocol may not be appropriate, and a different regeneration protocol, or none at all, might be selected.

As noted, the relative soot loading state of filter 22 may also impact the determination at step 150. For instance, if filter 22 is relatively highly loaded with soot, it may be desirable to enable regeneration or alert the operator to park machine 10 in anticipation of regeneration regardless of machine operating status, to avoid loss of efficiency or other problems such as damage to filter 22. Similarly, if filter 22 is not so highly loaded with soot, but operating status of machine is such that regeneration is considered appropriate, it may be concluded that regeneration should be enabled even though filter 22 could theoretically continue to filter soot for some time. Still another way to understand the determination at step 150 is that data processor 44 may be balancing the often competing concerns of enabling regeneration at a desired time and under desired conditions of filter 22 with current service conditions of machine 10. From step 150, the process may proceed to step 160 at which data processor 44 may enable regeneration such as by outputting a regeneration initiation command to system 34. If, at step 150, regeneration is not appropriate, the process may proceed to Exit at step 155. Either action, outputting the regeneration command or outputting another signal to exit the control process, may be understood as outputting a regeneration suitability signal as discussed above. From step 160, the process may proceed to Finish at step 165, or loop back to repeat.

Figure 8:
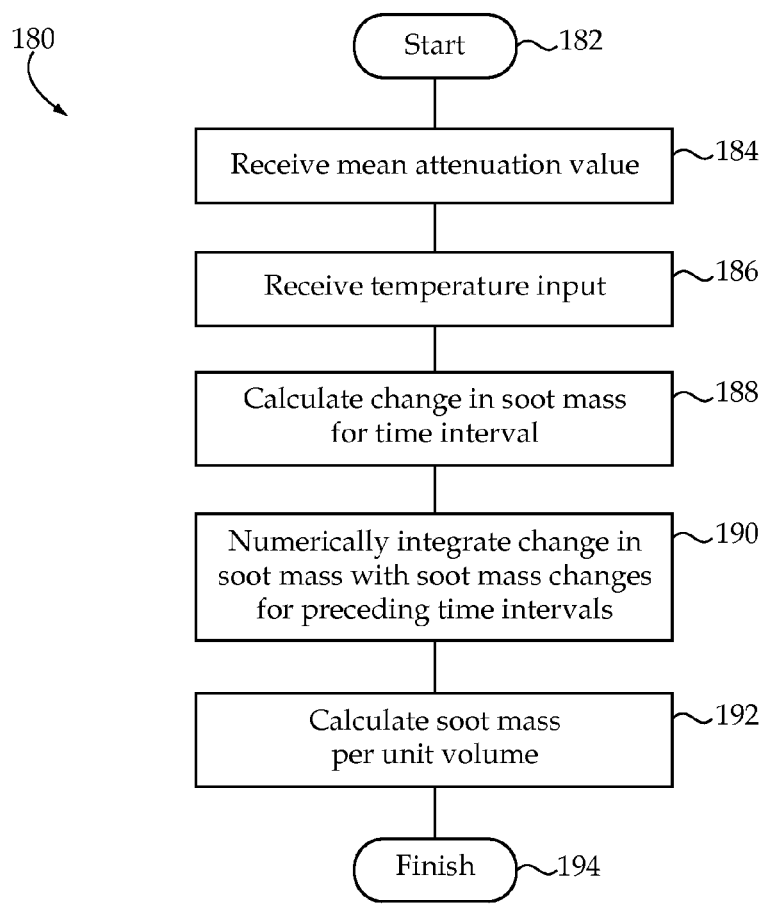
FIG. 8 is a flowchart illustrating an example soot mass calculation according to one embodiment.

Turning now to FIG. 8, there is shown a flowchart 180 illustrating example steps in a process of calculating a soot loading state of filter 22. The process steps shown in FIG. 8 may thus be understood as steps which might take place in parallel with, or as a sub-loop of, the process of flowchart 100, such as during step 130. The process of flowchart 180 may Start at step 182, and proceed to step 184 to receive the mean attenuation value. From step 184, the process may proceed to step 186 to receive a temperature input. From step 186, the process may proceed to step 188 to calculate the change in soot mass for the present time interval, and electronically record the calculated change in soot mass on computer readable memory 54. It should be appreciated that the calculated change may be used in real time, thus the present description of "recording" the change, or a value indicative thereof, should not be understood to mean that the change is stored for use at a later time. The results of step 188 will nevertheless typically be electronically stored somewhere, even if only momentarily. From step 188, the process may proceed to step 190 at which data processor 44 may numerically integrate the change in soot mass with soot mass changes for one or more preceding time intervals. From step 190, the process may proceed to step 192 to calculate soot mass per unit of available volume of filter 22. As described herein, calculating the soot mass per unit volume may include accounting for an amount of trapped ash within filter 22, indicated via ash input 135. Ash input 135 may include or encode the determined ash value discussed above. From step 192, the process may proceed to step 194 to Finish.

Figure 9:
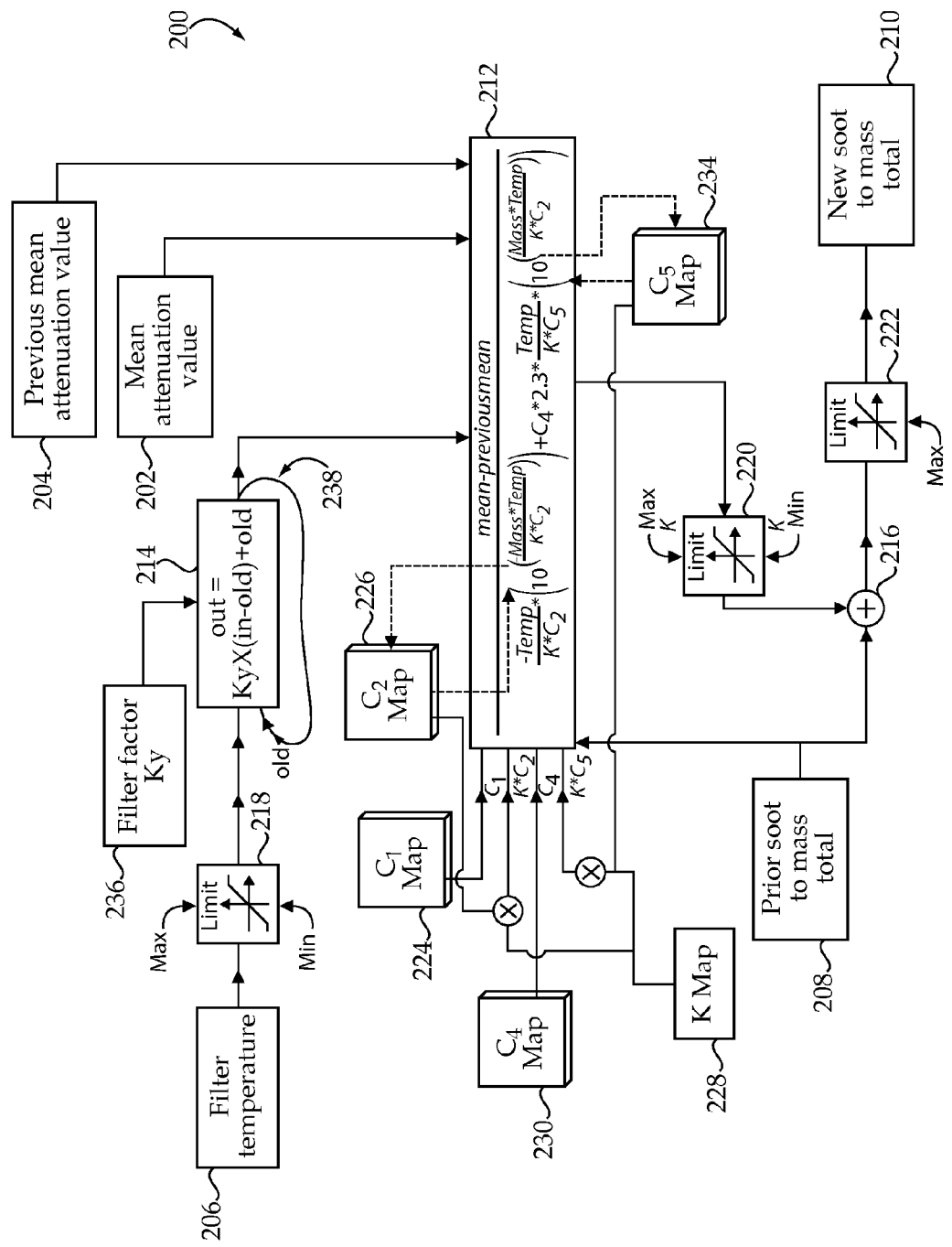
FIG. 9 is a computational diagram for calculating soot mass, according to one embodiment.

Turning now to FIG. 9, there is shown a computational diagram illustrating one practical implementation strategy whereby a total mass of trapped soot within filter 22 is calculated. Diagram 200 includes various computational and signal processing steps/actions whereby a mean attenuation value 202, a filter temperature 206, a previous mean attenuation value 204, and a prior soot mass total 208 are used to determine a new soot mass total 210. In diagram 200, mean attenuation value 202 and previous mean attenuation value 204 represent values indicative of mean attenuation of transmitted electromagnetic energy at a beginning of a time interval and at an end of the time interval, respectively. The values 202 and 204 are used in a main calculation 212, as is the prior soot mass total 208. Value 202 may be a temperature compensated mean value derived from a raw mean attenuation value, as further described below.

Filter temperature 206 is used in main calculation 212, after being processed according to a limit map 218, and a filter 214 including a loop 238 and a filter factor 236 which may include an empirically derived numerical value. At filter 214, a value based on a difference between a current filter temperature input ("in") and a previous filter temperature input ("old"), plus the previous filter temperature input, may be multiplied by the filter factor $k_y$, and the result used in main calculation 212.

The calibration coefficients $C_1$, and $C_4$ may also be used in main calculation 212, as may calibration coefficients $KC_2$ and $KC_5$. In the illustrated embodiment, a $C_1$ map 224 calibrates coefficient $C_1$, a $C_2$ map 226 calibrates coefficient $C_2$, a $C_4$ map 230 calibrates coefficient $C_4$, and a $C_5$ map 234 calibrates coefficient $C_5$. Each of the respective maps may include a three dimensional map having two hardware coordinates based upon the selected hardware used for soot sensing system 42, and another coordinate corresponding to an intake cycle temperature of exhaust particulate filter 22 and determined by way of known techniques. A gain map 228 may include a three dimensional map having a first coordinate which includes a hardware dependent coordinate based upon the selected hardware for system 42, a second coordinate corresponding to intake cycle temperature, and a third coordinate based upon soot volume which may be determined by way of techniques which will be readily apparent to those skilled in the art. Coefficients $C_2$ and $C_5$ may be multiplied by the gain K and the results used in main calculation 212. A calculated soot mass increase since the previous loop may result from main calculation 212, and then processed according to a limit map 220. Limit map 220 may include upper and lower limits varying based upon gain K, and keeps the derivative bounded to real-world rates of change. Limit map 220 also avoids the calculated soot mass increase from jumping when initializing. The limited mass amount processed according to limit map 220 may be integrated with the prior soot mass total 208 at an adder 216, and the result limited via another limit map 222, rendering the new soot mass total 210.

Figure 10:
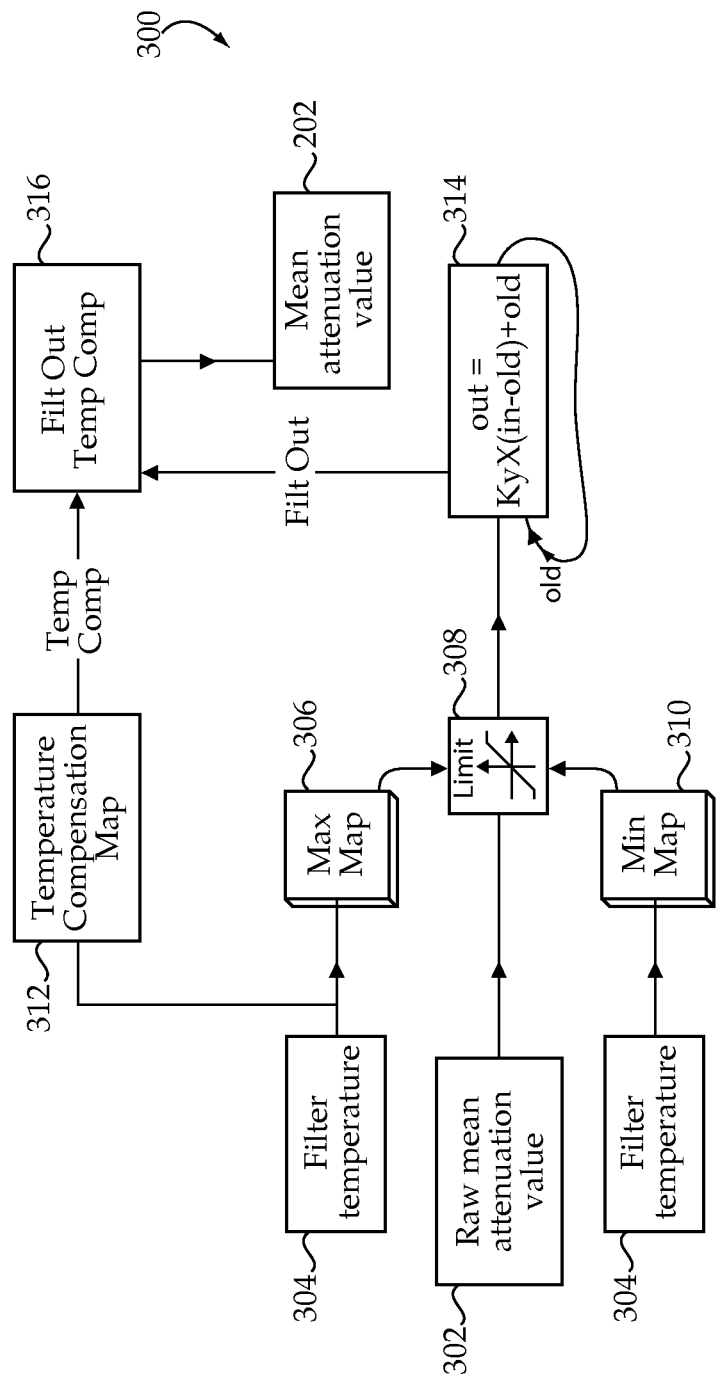
FIG. 10 is another computational diagram relating to the soot mass calculation of FIG. 9.

Referring now to FIG. 10, there is shown another computational diagram 300 whereby a raw mean attenuation value 302 is temperature compensated. The raw mean attenuation value 302 may be processed according to a limit map 308, in turn having a maximum and minimum based on a Max map 306 and a Min map 310. Each of maps 306 and 310 may have coordinates varying in response to filter temperature 304. A temperature compensation map 312 also varies based upon filter temperature 304. A temperature compensation value Temp Comp is calculated via map 312. The Temp Comp value may be multiplied at computation 316 by a value Filt Out from a filter 314. Filter 314 may execute in a manner similar to filter 214 discussed above, and may also include a similar filter factor. The product of the multiplication at computation 316 is mean attenuation value 202, used in the calculations of diagram 200. In general terms, the extent of temperature change between two sampling periods is used at filter 314 to arrive at the Filt Out value, whereas temperature compensation map 312 uses an absolute value of filter temperature to determine Temp Comp. It may thus be appreciated that the example computations shown in diagram 300 represent a determination of how much the raw attenuation value should be adjusted based in part on what the filter temperature 304 is at the end of a sampling period, or time interval, and also based in part on how much the filter temperature 304 has changed since the last sampling period or end of the last time interval.

From the foregoing description it will be understood that numerous different factors pertinent to calculating soot may be varying based upon other factors, resulting in numerous cross coupled relationships. As discussed above, filter temperature may be expected to be rising and falling nearly continuously during operation of exhaust particulate filter system 20. The changes in temperature result at least in part from changes in the temperature of engine exhaust, and for the reasons described herein can impact soot detection in a number of ways. Notable among the various effects of temperature is the way in which attenuation of electromagnetic energy in response to trapped soot can change with changes in temperature. It will be recalled that an increasing amount of trapped soot may be associated with an increasing sensitivity to temperature. In other words, the greater the soot mass the more attenuation of electromagnetic energy is affected. It will also be recalled that attenuation of electromagnetic energy may be correlated with a magnitude of temperature prior to the saturation points discussed above, but may become negatively correlated after the saturation points. The actual temperature of soot, however, will not typically be the same as filter inlet temperature, since increases or decreases in exhaust gas temperature will not instantaneously change the soot temperature. Filter factor $k_y$ as discussed above enables compensating for this discrepancy. Still other computational, sensing, and general filter operating techniques may exist or be developed where soot detection and regeneration control takes place differently from what is taught herein, but where the presently disclosed discoveries as to the effects of temperature may find application.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A method of operating an exhaust particulate filter system for an internal combustion engine comprising the steps of:

transmitting electromagnetic energy through an exhaust particulate filter containing trapped soot and ash;

attenuating the transmitted electromagnetic energy in response to the trapped soot;

determining an ash value indicative of an amount of the trapped ash;

determining which of a plurality of available regeneration protocols is appropriate; and outputting a regeneration suitability signal associated with the regeneration protocol determined to be appropriate, wherein the determining which of a plurality of available regeneration suitability signal step is responsive to an attenuation of the transmitted electromagnetic energy and the determined ash value.

2. The method of claim 1 further comprising a step of determining a soot value indicative of a relative soot loading state of the exhaust particulate filter responsive to the attenuation and the amount of trapped ash, and wherein the step of outputting includes outputting the regeneration suitability signal responsive to the determined soot value.

3. The method of claim 2 further comprising a step of comparing the soot value with a reference value, and wherein the step of outputting further includes outputting the regeneration suitability signal responsive to a difference between the soot value and the reference value.

4. The method of claim 2 wherein the step of determining further includes calculating a soot value indicative of a ratio of the trapped soot to available filter volume.

5. The method of claim 4 further comprising the steps of receiving data indicative of the attenuation, and desensitizing the calculation to variance in the data.

6. The method of claim 5 wherein the step of desensitizing further includes desensitizing the calculation to resonance-induced excursions in the data.

7. The method of claim 5 wherein: the step of transmitting further includes transmitting a collection of electromagnetic frequencies including at least one resonance frequency of the exhaust particulate filter; and the step of desensitizing further includes desensitizing the calculation at least in part by predominating the collection of electromagnetic frequencies with non-resonance frequencies.

8. The method of claim 2 wherein the step of transmitting further includes transmitting a collection of electromagnetic frequencies.

9. The method of claim 8 wherein the collection of electromagnetic frequencies are greater than about 2 GHz.

10. The method of claim 9 wherein the collection of electromagnetic frequencies are within a frequency band between about 2.1 GHz and about 2.2 GHz.

11. The method of claim 8 further comprising a step of receiving transmitted electromagnetic energy at the collection of electromagnetic frequencies, and calculating an attenuation value responsive to a difference between a transmission strength and a received strength of the electromagnetic energy at the collection of electromagnetic frequencies.

12. The method of claim 11 wherein the step of calculating an attenuation value includes calculating a mean attenuation value.

13. The method of claim 12 wherein the step of determining a soot value includes determining the soot value responsive to the mean attenuation value.

14. An exhaust particulate filter system for an internal combustion engine comprising:

an exhaust particulate filter including a housing having an exhaust inlet, an exhaust outlet, and a filter medium configured to trap soot and ash in exhaust from the internal combustion engine passing between the exhaust inlet and the exhaust outlet;

a control system including a transmitter coupled with the exhaust particulate filter and configured to transmit electromagnetic energy through the exhaust particulate filter, and a receiver coupled with the exhaust particulate filter and configured to sense transmitted electromagnetic energy;

the control system further including a data processor coupled with the transmitter and the receiver and configured to receive data indicative of an attenuation of the transmitted electromagnetic energy in response to trapped soot, the data processor being further configured to determine an ash value indicative of an amount of trapped ash within the exhaust particulate filter, the data processor being further configured to determine which of a plurality of available regeneration protocols is appropriate and output a regeneration suitability signal associated with the regeneration protocol determined to be appropriate, wherein the determining which of a plurality of available regeneration suitability signals is responsive to the attenuation and the determined ash value and total filter medium volume.

15. The exhaust particulate filter system of claim 14 wherein the data processor is further configured to determine a soot value indicative of a relative soot loading state of the exhaust particulate filter responsive to the attenuation and the amount of trapped ash, and a temperature associated with the filter and the data processor interprets the attenuation depending upon the temperature associated with the filter.

16. The exhaust particulate filter system of claim 15 wherein the transmitter is configured to transmit the electromagnetic energy at a collection of frequencies, and wherein the data indicative of attenuation includes data indicative of a mean attenuation of the electromagnetic energy at the collection of frequencies.

17. The exhaust particulate filter system of claim 15 wherein the data processor is further configured to compare the determined soot value with a stored reference value, and responsively output the regeneration suitability signal.

18. The exhaust particulate filter system of claim 17 wherein the transmitter is further configured to transmit the electromagnetic energy within a frequency band between about 2.0 GHz and about 2.5 GHz.

19. The exhaust particulate filter system of claim 14 wherein the particulate sensing system is further configured to calculate the ash value.

20. A method of operating an exhaust particulate filter system for an internal combustion engine comprising the steps of:

transmitting electromagnetic energy at a transmission strength through an exhaust particulate filter containing trapped soot and ash, the transmitted electromagnetic energy having a frequency greater than about 2 GHz;

sensing a reduced strength of the transmitted electromagnetic energy after attenuating the transmitted electromagnetic energy in response to the trapped soot;

determining an ash value indicative of an amount of the trapped ash;

determining a temperature associated with the filter system;

considering the transmitted electromagnetic energy strength in view of the temperature;

determining which of a plurality of available regeneration protocols is appropriate; and outputting a signal associated with the regeneration protocol determined to be appropriate, wherein the determining which of a plurality of available regeneration suitability signal step is responsive to the determined ash value and to a difference between the transmission strength and the reduced strength.

* * * * *